(12) United States Patent
Higashidozono

(10) Patent No.: US 12,359,729 B2
(45) Date of Patent: Jul. 15, 2025

(54) VALVE

(71) Applicant: EAGLE INDUSTRY CO., LTD., Tokyo (JP)

(72) Inventor: Hideki Higashidozono, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/029,065

(22) PCT Filed: Sep. 24, 2021

(86) PCT No.: PCT/JP2021/034996
§ 371 (c)(1),
(2) Date: Mar. 28, 2023

(87) PCT Pub. No.: WO2022/071093
PCT Pub. Date: Apr. 7, 2022

(65) Prior Publication Data
US 2023/0375066 A1    Nov. 23, 2023

(30) Foreign Application Priority Data
Oct. 1, 2020 (JP) .................. 2020-166936

(51) Int. Cl.
*F16K 1/46* (2006.01)
*F16K 1/36* (2006.01)
*F16K 1/42* (2006.01)

(52) U.S. Cl.
CPC .................. *F16K 1/46* (2013.01); *F16K 1/36* (2013.01); *F16K 1/42* (2013.01)

(58) Field of Classification Search
CPC ... F16K 1/42; F16K 1/46; F16K 1/465; F16K 1/36; F16K 1/443; F16K 1/44;
(Continued)

(56) References Cited

U.S. PATENT DOCUMENTS 813,555 A * 2/1906 Hayden ..................... F16K 1/34
251/357
821,758 A * 5/1906 Smith ....................... F16K 1/46
251/368
(Continued)

FOREIGN PATENT DOCUMENTS

| CN | 107339442 | 11/2017 | ............... F16K 1/02 |
| CN | 209146387 | 7/2019 | ............ F16K 31/42 |

(Continued)

OTHER PUBLICATIONS

International Search Report and Written Opinion and International Preliminary Report on Patentability issued in PCT/JP2021/027769, dated Sep. 7, 2021, 24 pages.
(Continued)

*Primary Examiner* — David Colon-Morales
(74) *Attorney, Agent, or Firm* — HAYES SOLOWAY P.C.

(57) ABSTRACT

Provided is a valve capable of reliably blocking a gap between a valve body and a valve seat at least in a valve closed state. A valve includes a valve seat and a valve body, wherein the valve body and the valve seat are apart from each other at a radial gap and are arranged to be relatively movable in a reciprocating manner and an elastically deformable annular sealing body extends from one of the valve body and the valve seat so as to seal the gap.

6 Claims, 7 Drawing Sheets

(58) Field of Classification Search
CPC .... F16K 47/02; F16K 47/04; F16K 2200/102;
F16K 2200/101; F16K 2200/10
USPC ........................................................ 251/334
See application file for complete search history.

(56) References Cited

U.S. PATENT DOCUMENTS

| | | | | |
|---|---|---|---|---|
| 877,865 A * | 1/1908 | Ricksecker | ............... | F16K 1/34 251/357 |
| 1,449,876 A * | 3/1923 | Erastus | ............... | F01L 3/20 123/188.8 |
| 1,614,002 A | 1/1927 | Horton | ............... | A62C 35/605 |
| 1,758,471 A * | 5/1930 | Schmidt | ............... | F16K 1/46 251/223 |
| 1,800,127 A * | 4/1931 | Wilson | ............... | F16K 1/34 251/357 |
| 1,847,385 A * | 3/1932 | Dengler | ............... | F16K 1/34 251/86 |
| 2,196,798 A * | 4/1940 | Horstmann | ............... | F16K 1/36 251/368 |
| 2,267,515 A | 12/1941 | Wilcox | ............... | F16K 31/0627 |
| 2,331,503 A | 10/1943 | Ray | ............... | F16K 41/10 |
| 2,797,061 A | 6/1957 | Buchanan | ............... | F16K 31/06 |
| 2,887,293 A | 5/1959 | Fred | ............... | F16K 31/60 |
| 2,893,685 A * | 7/1959 | Camp | ............... | F16K 1/36 251/210 |
| 2,898,082 A * | 8/1959 | Von Almen | ............... | F04B 53/1027 251/360 |
| 3,049,332 A | 8/1962 | Webster | ............... | F16K 1/02 |
| 3,054,422 A * | 9/1962 | Napolitano | ............... | F16K 1/385 277/648 |
| 3,070,120 A * | 12/1962 | Wendt | ............... | F16K 1/46 251/332 |
| 3,185,438 A * | 5/1965 | Smirra | ............... | F16K 1/34 251/332 |
| 3,204,925 A | 9/1965 | Enrico | ............... | F16K 1/50 |
| 3,230,973 A * | 1/1966 | Schork | ............... | F16K 1/46 137/625.33 |
| 3,278,156 A | 10/1966 | Callahan | ............... | F16K 41/10 |
| 3,360,304 A | 12/1967 | Adams | ............... | B61K 7/12 |
| 3,394,732 A * | 7/1968 | Lisciani | ............... | F16K 1/36 137/854 |
| 3,426,741 A * | 2/1969 | Haagen | ............... | F01L 3/02 123/188.9 |
| 3,483,888 A | 12/1969 | Hugo | ............... | F16K 15/046 |
| 3,623,699 A | 11/1971 | Matousek | ............... | F16K 1/46 |
| 3,627,257 A | 12/1971 | Stamfil | ............... | F16K 31/0693 |
| 3,679,169 A | 7/1972 | Bedo | ............... | F16K 41/02 |
| 3,854,495 A | 12/1974 | Cowley | ............... | G05D 16/0663 |
| 4,085,921 A | 4/1978 | Ueda et al. | ............... | F16K 31/06 |
| 4,149,699 A | 4/1979 | Speckmann | ............... | F16K 41/00 |
| 4,318,532 A * | 3/1982 | Winkler | ............... | F16K 1/34 251/333 |
| 4,345,739 A * | 8/1982 | Wheatley | ............... | F16K 1/2263 251/900 |
| 4,364,615 A | 12/1982 | Euler | ............... | F16C 27/04 |
| 4,417,601 A | 11/1983 | Bennett | ............... | A62C 31/12 |
| 4,448,038 A | 5/1984 | Barbier | ............... | F25B 41/34 |
| 4,474,356 A | 10/1984 | Baumann | ............... | F16K 1/12 |
| 4,579,145 A | 4/1986 | Leiber | ............... | F16H 61/0251 |
| 4,615,358 A | 10/1986 | Hammond | ............... | F15B 13/0402 |
| 4,617,889 A | 10/1986 | Nishimiya | ............... | F02D 31/00 |
| 4,632,358 A | 12/1986 | Orth | ............... | F25B 41/347 |
| 4,778,150 A | 10/1988 | Pratt | ............... | F16K 41/043 |
| 4,825,909 A | 5/1989 | Martin | ............... | F15B 13/02 |
| 4,848,729 A * | 7/1989 | Danzy | ............... | F16K 1/46 251/332 |
| 4,895,192 A | 1/1990 | Mortenson | ............... | F01M 11/04 |
| 4,915,355 A * | 4/1990 | Fort | ............... | F16K 1/46 277/910 |
| 4,917,150 A | 4/1990 | Koch | ............... | F16K 31/0606 |
| 4,922,957 A * | 5/1990 | Johnson | ............... | F16K 1/46 137/902 |
| 4,923,173 A * | 5/1990 | Szymaszek | ............... | F16K 1/36 251/356 |
| 4,979,542 A | 12/1990 | Mesenich | ............... | F02M 47/027 |
| 4,998,559 A | 3/1991 | McAuliffe | ............... | F16H 61/0251 |
| 5,011,116 A * | 4/1991 | Alberts | ............... | F16K 47/00 137/488 |
| 5,060,695 A | 10/1991 | McCabe | ............... | G05D 16/2024 |
| 5,217,047 A | 6/1993 | McCabe | ............... | F16H 16/0251 |
| 5,232,195 A | 8/1993 | Torrielli | ............... | H01F 7/1607 |
| 5,246,205 A * | 9/1993 | Gillingham | ............... | F01N 3/0212 251/86 |
| 5,263,694 A | 11/1993 | Smith | ............... | B60G 15/068 |
| 5,364,066 A | 11/1994 | Dorste | ............... | F25B 41/35 |
| 5,409,036 A | 4/1995 | Ahmadian | ............... | H01F 7/14 |
| 5,439,027 A | 8/1995 | Layton | ............... | F16K 1/385 |
| 5,702,235 A | 12/1997 | Hirota | ............... | F04B 27/1804 |
| 5,778,932 A | 7/1998 | Alexander | ............... | G05D 16/2024 |
| 6,010,312 A | 1/2000 | Suitou | ............... | F64B 27/1804 |
| 6,019,118 A | 2/2000 | Voggenreiter et al. | ............... | F16K 51/02 |
| 6,155,391 A | 12/2000 | Kashiwagi et al. | .... | F16F 9/348 |
| 6,161,585 A | 12/2000 | Kolchinsky | ............... | F05D 16/2024 |
| 6,257,836 B1 | 7/2001 | Ota et al. | ............... | 417/222.02 |
| 6,315,266 B1 | 11/2001 | Hirota | ............... | F16K 31/406 |
| 6,321,995 B1 | 11/2001 | Badovick | ............... | F25B 41/335 |
| 6,361,283 B1 | 3/2002 | Ota | ............... | F04B 27/1084 |
| 6,443,420 B1 | 9/2002 | Hettinger | ............... | F16K 31/02 |
| 6,481,976 B2 | 11/2002 | Kimura | ............... | F04B 27/1804 |
| 6,626,000 B1 | 9/2003 | Meyer | ............... | F25B 41/345 |
| 6,776,182 B2 * | 8/2004 | Ishitoya | ............... | F16K 25/00 137/202 |
| 6,811,140 B1 * | 11/2004 | Maini | ............... | F16K 1/46 251/357 |
| 6,840,504 B2 * | 1/2005 | Hagiwara | ............... | F16K 1/36 251/332 |
| 6,959,718 B2 * | 11/2005 | Kayahara | ............... | F16K 31/0655 251/210 |
| 7,007,917 B2 | 3/2006 | Choi | ............... | F16K 31/0655 |
| 7,040,595 B2 | 5/2006 | Hirota | ............... | F16K 31/02 |
| 7,481,417 B2 * | 1/2009 | Mayer | ............... | F16K 51/02 251/356 |
| 7,533,687 B2 | 5/2009 | Uemura | ............... | F16K 27/048 |
| 7,726,949 B2 | 6/2010 | Taguchi | ............... | F04B 1/26 |
| 7,758,014 B2 | 7/2010 | Lancaster | ............... | F16K 1/04 |
| 7,832,653 B2 | 11/2010 | Yukimoto | ............... | F25B 41/39 |
| 7,958,908 B2 | 6/2011 | Cho et al. | ............... | F15B 13/044 |
| 7,971,797 B2 * | 7/2011 | Habermann | ............... | F16K 31/002 251/368 |
| 8,021,124 B2 | 9/2011 | Umemura | ............... | F04B 27/1804 |
| 8,079,827 B2 | 12/2011 | Iwa | ............... | F04B 27/1804 |
| 8,128,061 B2 | 3/2012 | Uemura | ............... | F04B 27/1804 |
| 8,225,818 B1 | 7/2012 | Stephens | ............... | F15B 13/0442 |
| 8,328,163 B2 * | 12/2012 | Boesch | ............... | F16K 1/36 251/363 |
| 8,387,947 B2 | 3/2013 | Uemura | ............... | F04B 27/1804 |
| 8,469,337 B1 * | 6/2013 | Hoeptner, III | ............... | F16K 1/36 251/284 |
| 8,579,257 B2 * | 11/2013 | Taylor | ............... | F16K 1/46 251/324 |
| 8,651,826 B2 | 2/2014 | Futakuchi | ............... | F04B 27/1804 |
| 8,684,037 B2 | 4/2014 | Huynh | ............... | F15B 13/01 |
| 9,022,346 B2 | 5/2015 | Najmolhoda | ............... | F16K 31/0613 |
| 9,027,598 B2 | 5/2015 | Schneider | ............... | F16K 31/0613 |
| 9,132,714 B2 | 9/2015 | Futakuchi | ............... | F04B 27/1804 |
| 9,243,733 B2 * | 1/2016 | Lively | ............... | G05D 16/02 |
| 9,297,373 B2 | 3/2016 | Bagagli | ............... | F16K 15/026 |
| 9,383,021 B2 * | 7/2016 | Kosmehl | ............... | F16K 1/36 |
| 9,400,027 B2 | 7/2016 | Imaizumi | ............... | F16F 1/32 |
| 9,453,518 B2 | 9/2016 | Schulz | ............... | F15B 13/043 |
| 9,470,337 B2 * | 10/2016 | Roper | ............... | F16K 1/36 |
| 9,581,149 B2 | 2/2017 | Ota et al. | ............... | F04B 27/1804 |
| 9,581,150 B2 | 2/2017 | Ota et al. | ............... | F04B 27/1804 |
| 9,638,082 B2 * | 5/2017 | Fujita | ............... | F16K 25/00 |
| 9,732,874 B2 | 8/2017 | Saeki | ............... | F16K 31/0603 |
| 9,874,286 B2 | 1/2018 | Bagagli | ............... | F16K 15/12 |
| 10,113,539 B2 | 10/2018 | Sugamura | ............... | F04B 27/1804 |
| 10,378,657 B2 * | 8/2019 | Lin | ............... | F16K 1/46 |
| 10,519,944 B2 | 12/2019 | Taguchi | ............... | F04B 27/1804 |

(56) References Cited

U.S. PATENT DOCUMENTS

| | | | |
|---|---|---|---|
| 10,557,463 B2 | 2/2020 | Sugamura | F04B 27/1804 |
| 10,690,125 B2 | 6/2020 | Hayama | F04B 27/18 |
| 10,784,804 B2 | 9/2020 | Sasaki | H02P 25/022 |
| 10,837,431 B2 | 11/2020 | Tonegawa | F04B 49/22 |
| 11,085,431 B2 | 8/2021 | Fukudome et al. | F16K 31/06 |
| 11,092,244 B1* | 8/2021 | Hu | F16K 1/36 |
| 11,480,166 B2 | 10/2022 | Hayama et al. | F04B 27/10 |
| 2001/0003573 A1 | 6/2001 | Kimura et al. | 417/222.2 |
| 2002/0134444 A1 | 9/2002 | Isobe | F16K 27/041 |
| 2003/0145615 A1 | 8/2003 | Sasaki | F16K 31/0637 |
| 2003/0197141 A1 | 10/2003 | Kajitani | F16L 47/00 |
| 2003/0202885 A1 | 10/2003 | Taguchi | F04B 49/00 |
| 2004/0045305 A1 | 3/2004 | Murase | F25B 49/022 |
| 2004/0165994 A1 | 8/2004 | Umemura | F04B 27/1804 |
| 2005/0076959 A1 | 4/2005 | Yamamoto | F16K 31/0624 |
| 2005/0151310 A1 | 7/2005 | Rodeffer | F16F 1/32 |
| 2005/0163624 A1 | 7/2005 | Taguchi | F04B 27/1804 |
| 2007/0214814 A1 | 9/2007 | Umemura et al. | |
| 2007/0264134 A1 | 11/2007 | Hirota | F04B 27/1804 |
| 2008/0138213 A1 | 6/2008 | Umemura et al. | 417/222.2 |
| 2008/0175727 A1 | 7/2008 | Umemura et al. | F04B 49/22 |
| 2009/0108221 A1 | 4/2009 | Umemura et al. | 251/129.15 |
| 2009/0114871 A1 | 5/2009 | Iwa | F04B 27/14 |
| 2009/0183786 A1 | 7/2009 | Iwa | 137/487.5 |
| 2009/0256091 A1 | 10/2009 | Nordstrom | F16K 31/0613 |
| 2010/0019406 A1 | 1/2010 | Shoji et al. | F16K 1/34 |
| 2010/0051838 A1 | 3/2010 | Uemura | F04B 27/1804 |
| 2010/0282991 A1 | 11/2010 | Okamoto | F16K 31/02 |
| 2011/0041941 A1 | 2/2011 | Sonsterod | F16K 15/14 |
| 2011/0061749 A1 | 3/2011 | Okamoto | F16K 31/0655 |
| 2011/0089352 A1 | 4/2011 | Morgan | F16K 11/0716 |
| 2011/0203888 A1 | 8/2011 | Sonsterod | F16F 9/32 |
| 2012/0056113 A1 | 3/2012 | Tano | F04B 27/1804 |
| 2012/0097881 A1 | 4/2012 | Aoyama | F16K 1/425 |
| 2012/0198992 A1 | 8/2012 | Futakuchi et al. | 91/505 |
| 2012/0198993 A1 | 8/2012 | Fukudome | 91/505 |
| 2012/0211686 A1 | 8/2012 | Okamoto | F16K 31/0655 |
| 2013/0291963 A1 | 11/2013 | Futakuchi et al. | 137/487.5 |
| 2014/0099214 A1 | 4/2014 | Fukudome | 417/222.2 |
| 2014/0109973 A1 | 4/2014 | Neumeister | C23C 16/4412 |
| 2014/0130916 A1 | 5/2014 | Saeki | F16K 31/0613 |
| 2014/0294632 A1 | 10/2014 | Kondo et al. | 417/434 |
| 2014/0369862 A1 | 12/2014 | Ota et al. | F04B 27/1804 |
| 2015/0004010 A1 | 1/2015 | Saeki | F04B 27/1804 |
| 2015/0021131 A1 | 1/2015 | Wootten | F16F 9/348 |
| 2015/0027573 A1 | 1/2015 | Ochiai | F15B 13/0402 |
| 2015/0044067 A1 | 2/2015 | Ota et al. | F04B 27/1804 |
| 2015/0068628 A1 | 3/2015 | Iwa | 137/625.65 |
| 2015/0104334 A1 | 4/2015 | Ota et al. | F04B 27/1804 |
| 2015/0275874 A1 | 10/2015 | Ota | F04B 27/1804 |
| 2015/0276065 A1* | 10/2015 | Yoshida | F16K 3/246 |
| | | | 251/333 |
| 2015/0345655 A1 | 12/2015 | Higashidozono | 137/624.27 |
| 2016/0053755 A1 | 2/2016 | Taguchi | F04B 49/22 |
| 2016/0208954 A1 | 7/2016 | Ito et al. | F16K 39/02 |
| 2016/0290326 A1 | 10/2016 | Sugamura | F04B 27/1804 |
| 2017/0261113 A1 | 9/2017 | Sato | F16K 31/0675 |
| 2017/0284562 A1 | 10/2017 | Hayama | F16K 41/00 |
| 2018/0156345 A1 | 6/2018 | Kanda | F15B 13/0431 |
| 2018/0187793 A1 | 7/2018 | Futakuchi | F04B 39/08 |
| 2018/0238455 A1 | 8/2018 | Yazawa | F16K 31/508 |
| 2018/0291888 A1 | 10/2018 | Tonegawa et al. | F04B 49/22 |
| 2018/0372129 A1* | 12/2018 | Kato | F15B 13/0402 |
| 2019/0162175 A1 | 5/2019 | Higashidozono | F04B 27/18 |
| 2019/0293061 A1 | 9/2019 | Kume | F16K 11/048 |
| 2020/0011444 A1 | 1/2020 | Morita et al. | F16K 31/04 |
| 2020/0032781 A1 | 1/2020 | Higashidozono | F16K 31/0624 |
| 2020/0088178 A1 | 3/2020 | Fukudome et al. | F16K 31/06 |
| 2020/0173580 A1* | 6/2020 | Sandeck | F16K 51/02 |
| 2020/0309105 A1 | 10/2020 | Hayama et al. | F04B 27/18 |
| 2020/0318624 A1 | 10/2020 | Hayama | F04B 27/18 |
| 2020/0325881 A1 | 10/2020 | Hayama et al. | F04B 27/18 |
| 2020/0332786 A1 | 10/2020 | Hayama | F04B 27/1804 |
| 2020/0362974 A1 | 11/2020 | Hayama et al. | F16K 11/24 |
| 2020/0370545 A1 | 11/2020 | Hayama et al. | F04B 27/18 |
| 2021/0372396 A1 | 12/2021 | Kurihara | G05D 7/0635 |
| 2021/0404570 A1 | 12/2021 | Hayama et al. | F16K 17/04 |
| 2022/0213878 A1 | 7/2022 | Fukudome et al. | F04B 27/18 |

FOREIGN PATENT DOCUMENTS

| | | | |
|---|---|---|---|
| CN | 110260001 | 9/2019 | F16K 15/016 |
| CN | 110735965 | 1/2020 | F16K 1/00 |
| CN | 111279076 | 6/2020 | F04B 247/18 |
| CN | 111316028 | 6/2020 | F16K 31/06 |
| CN | 111417780 | 7/2020 | F04B 27/18 |
| DE | 2414893 | 10/1975 | F16K 15/00 |
| DE | 2706439 | 8/1978 | F16K 11/04 |
| DE | 102006033747 | 1/2008 | F16K 31/00 |
| EP | 0229315 | 7/1987 | F02M 3/07 |
| EP | 0229315 A2 * | 7/1987 | |
| EP | 1519128 | 3/2005 | F25B 41/06 |
| EP | 2180217 | 4/2010 | F16K 31/06 |
| EP | 2594794 | 5/2013 | F04B 27/18 |
| EP | 3056778 | 8/2016 | F16K 31/04 |
| EP | 3258103 | 12/2017 | F04B 27/18 |
| EP | 3296599 | 3/2018 | F16K 1/34 |
| EP | 3366957 | 8/2018 | F16K 1/34 |
| EP | 3726054 | 10/2020 | F04B 27/18 |
| JP | 5682358 | 7/1981 | G03B 15/00 |
| JP | 5740945 | 8/1982 | B21B 39/14 |
| JP | H04171361 | 6/1992 | F04B 49/00 |
| JP | 5346276 | 12/1993 | F25B 41/96 |
| JP | 626454 | 2/1994 | F04B 27/08 |
| JP | H0711313 | 2/1995 | F16K 1/34 |
| JP | H8159320 | 6/1996 | F16K 31/04 |
| JP | H09144931 | 6/1997 | F16K 31/06 |
| JP | H10220926 | 8/1998 | F25B 41/06 |
| JP | 11287281 | 10/1999 | F16F 9/348 |
| JP | 200020763 | 8/2000 | F16K 31/06 |
| JP | 2000304152 | 11/2000 | F16D 48/02 |
| JP | 2001012534 | 1/2001 | F16F 9/46 |
| JP | 2001501290 | 1/2001 | F16K 31/06 |
| JP | 2001153495 | 6/2001 | F16K 31/06 |
| JP | 2001153498 | 6/2001 | F16K 31/06 |
| JP | 2001165055 | 6/2001 | F04B 27/14 |
| JP | 2001263527 | 9/2001 | F16K 31/06 |
| JP | 2002216803 | 8/2002 | H01M 8/02 |
| JP | 2003004160 | 1/2003 | F16K 31/04 |
| JP | 2003301772 | 10/2003 | |
| JP | 2003314745 | 11/2003 | F16K 51/02 |
| JP | 2003322086 | 11/2003 | F04B 49/00 |
| JP | 2004003468 | 1/2004 | F04B 27/14 |
| JP | 2004101163 | 4/2004 | F25B 41/06 |
| JP | 2005307817 | 11/2005 | F04B 27/14 |
| JP | 2005351605 | 12/2005 | F16K 1/38 |
| JP | 2006153204 | 6/2006 | F16K 31/04 |
| JP | 2007247512 | 9/2007 | F04B 27/14 |
| JP | 2008157031 | 7/2008 | F04B 27/14 |
| JP | 2008190574 | 8/2008 | F16K 31/06 |
| JP | 2009030752 | 2/2009 | F16K 31/06 |
| JP | 2009115204 | 5/2009 | F16K 31/04 |
| JP | 2009221965 | 10/2009 | F04B 27/14 |
| JP | 2009257523 | 11/2009 | F16K 31/06 |
| JP | 2009275550 | 11/2009 | F04B 49/00 |
| JP | 2010019406 | 1/2010 | F16K 31/04 |
| JP | 2011501798 | 1/2011 | F16K 15/14 |
| JP | 2011525962 | 9/2011 | F16F 9/32 |
| JP | 4822735 | 11/2011 | A43B 23/24 |
| JP | 2012144986 | 8/2012 | F04B 27/14 |
| JP | 2012211579 | 11/2012 | F04B 27/14 |
| JP | 2013024135 | 2/2013 | F04B 27/14 |
| JP | 5167121 | 3/2013 | F04B 27/14 |
| JP | 2013100915 | 5/2013 | F15B 51/06 |
| JP | 2013194918 | 9/2013 | F16K 1/36 |
| JP | 2014080927 | 5/2014 | F04B 27/16 |
| JP | 2014092207 | 5/2014 | F16K 31/06 |
| JP | 2014095463 | 5/2014 | F16K 31/06 |
| JP | 2014194180 | 10/2014 | F04B 27/14 |
| JP | 2015075054 | 4/2015 | F04B 27/14 |
| JP | 20151168 | 5/2015 | F04B 27/14 |
| JP | 2015137546 | 7/2015 | F04B 27/14 |
| JP | 2015178795 | 10/2015 | F04B 27/14 |
| JP | 5983539 | 8/2016 | F04B 27/18 |

(56) References Cited

FOREIGN PATENT DOCUMENTS

| | | | |
|---|---|---|---|
| JP | 2016196825 | 11/2016 | ............ F04B 27/18 |
| JP | 2016196876 | 11/2016 | ............ F04B 27/18 |
| JP | 2016205404 | 12/2016 | ............ F04B 27/18 |
| JP | 6135521 | 5/2017 | ............ F04B 27/18 |
| JP | 2017089832 | 5/2017 | ............ F16K 31/06 |
| JP | 2017180525 | 10/2017 | ............ F16K 31/04 |
| JP | 2017219060 | 12/2017 | ............ F16K 37/00 |
| JP | 2018015739 | 2/2018 | ............... C02F 1/46 |
| JP | 2018035840 | 5/2018 | |
| JP | 2018115684 | 7/2018 | ............ B60G 17/08 |
| JP | 2018135954 | 8/2018 | ............ F16K 31/06 |
| JP | 2018179087 | 11/2018 | ............ F16K 31/06 |
| JP | 2019002436 | 1/2019 | ............... F16K 3/26 |
| JP | 2019131725 | 8/2019 | |
| JP | 2019138473 | 8/2019 | ............... F16K 1/36 |
| JP | 2019167982 | 10/2019 | ............... F16K 1/38 |
| JP | 2019183960 | 10/2019 | ............ F16K 31/06 |
| JP | 2020041606 | 3/2020 | ............... F16K 1/44 |
| JP | 2020060108 | 4/2020 | ............ F04B 27/18 |
| KR | 20-0400543 | 10/2005 | ................. B60S 1/52 |
| KR | 1020080011375 | 2/2008 | ............ F04B 27/14 |
| KR | 102019001499 | 1/2019 | ............ F16K 31/06 |
| WO | WO9218795 | 10/1992 | ............... F16K 1/34 |
| WO | WO2006090760 | 8/2006 | ............ F04B 27/18 |
| WO | WO2007119380 | 10/2007 | ............ F04B 27/14 |
| WO | WO2009025298 | 2/2009 | ............ F16K 31/06 |
| WO | WO2011114841 | 9/2011 | ............ F04B 27/14 |
| WO | WO2011132438 | 10/2011 | ............ F16K 31/06 |
| WO | WO2012077439 | 6/2012 | ............ F04B 27/14 |
| WO | WO2014119594 | 8/2014 | ............ F04B 27/14 |
| WO | WO2014148367 | 9/2014 | ............ F16K 31/06 |
| WO | WO2018124156 | 7/2018 | ............ F16K 31/06 |
| WO | WO2019131482 | 7/2019 | ............ F04B 27/18 |
| WO | WO2020110925 | 11/2019 | ............ F04B 27/18 |
| WO | WO2020013169 | 1/2020 | ............ F04B 27/18 |
| WO | WO2020218284 | 10/2020 | ............ F04B 27/18 |

OTHER PUBLICATIONS

International Search Report and Written Opinion and International Preliminary Report on Patentability issued in PCT/JP2021/027762, dated Oct. 5, 2021, 20 pages.

International Search Report and Written Opinion and International Preliminary Report on Patentability issued in PCT/JP2021/027766, dated Sep. 7, 2021, 24 pages.

International Search Report and Written Opinion and International Preliminary Report on Patentability issued in PCT/JP2021/027770, dated Oct. 5, 2021, 20 pages.

International Search Report and Written Opinion and International Preliminary Report on Patentability issued in PCT/JP2021/027772, dated Sep. 21, 2021, 24 pages.

International Search Report and Written Opinion and International Preliminary Report on Patentability issued in PCT/JP2021/027767, dated Sep. 7, 2021, 22 pages.

International Search Report and Written Opinion and International Preliminary Report on Patentability issued in PCT/JP2021/030007, dated Nov. 2, 2021, 18 pages.

International Search Report and Written Opinion and International Preliminary Report on Patentability issued in PCT/JP2021/034996, dated Dec. 12, 2021, 18 pages.

International Search Report and Written Opinion and International Preliminary Report on Patentability issued in PCT/JP2021/034990, dated Oct. 19, 2021, 18 pages.

International Search Report and Written Opinion and International Preliminary Report on Patentability issued in PCT/JP2021/034995, dated Dec. 14, 2021, 16 pages.

Official Action issued in European related Application Serial No. 21853139.0, dated Mar. 22, 2024, 15 pages.

Official Action issued in European related Application Serial No. 21852577.2, dated Mar. 22, 2024, 9 pages.

Official Action issued in European related Application Serial No. 21853892.4, dated Mar. 22, 2024, 8 pages.

Official Action issued in U.S. Appl. No. 18/019,230, dated Apr. 25, 2024, 11 pages.

Official Action issued in U.S. Appl. No. 18/019,066, dated Apr. 24, 2024, 6 pages.

Official Action issued in U.S. Appl. No. 18/017,825, dated Apr. 15, 2024, 15 pages.

Official Action issued in U.S. Appl. No. 18/017,824, dated Mar. 13, 2024, 19 pages.

Official Action issued in U.S. Appl. No. 18/019,060, dated Apr. 26, 2024, 6 pages.

Notice of Allowance issued in U.S. Appl. No. 18/022,465, dated Apr. 25, 2024, 7 pages.

Official Action issued in European related Application Serial No. 21854468.2, dated Jul. 24, 2024, 7 pages.

Official Action issued in European related Application Serial No. 91853973.2, dated Jul. 25, 2024, 7 pages.

Official Action issued in European related Application Serial No. 21853972.4, dated Jul. 24, 2024, 8 pages.

Official Action issued in European related Application Serial No. 21872539.8, dated Sep. 3, 2024, 5 pages.

Official Action issued in European related Application Serial No. 21875395.2, dated Sep. 13, 2024, 7 pages.

Search Report issued in European related Application Serial No. 21906416.9, dated Oct. 22, 2024, 8 pages.

Official Action issued in Japanese related Application Serial No. 2022-541458, dated Oct. 15, 2024, 6 pages with English Translation.

Official Action issued in Korean related Application Serial No. 10-2023-7004906, dated Jun. 17, 2024, 10 pages with English Translation.

Official Action issued in Korean related Application Serial No. 10-2023-7004905, dated Jun. 17, 2024, 10 pages with English Translation.

Official Action issued in Korean related Application Serial No. 10-2023-7011145, dated Jun. 18, 2024, 6 pages with English Translation.

Official Action issued in Korean related Application Serial No. 10-2023-7004093, dated Jun. 17, 2024, 11 pages with English Translation.

Official Action issued in Korean related Application Serial No. 10-2023-7020969, dated Jun. 21, 2024, 8 pages with English Translation.

Official Action issued in related U.S. Appl. No. 18/027,599, dated Jun. 13, 2024, 16 pages.

Official Action issued in related U.S. Appl. No. 18/019,066, dated Sep. 5, 2024, 7 pages.

Official Action issued in related U.S. Appl. No. 18/019,060, dated Sep. 5, 2024, 7 pages.

Official Action issued in related U.S. Appl. No. 18/267,072, dated Sep. 6, 2024, 9 pages.

Official Action issued in related U.S. Appl. No. 18/027,599, dated Sep. 20, 2024, 15 pages.

Official Action issued in related U.S. Appl. No. 18/019,057, dated Sep. 27, 2024, 11 pages.

Official Action issued in related U.S. Appl. No. 18/267,072, dated Oct. 9, 2024, 15 pages.

Official Action issued in related U.S. Appl. No. 18/019,230, dated Oct. 15, 2024, 13 pages.

Notice of Allowance issued in U.S. Appl. No. 18/017,825, dated Aug. 8, 2024, 6 pages.

Notice of Allowance issued in U.S. Appl. No. 18/017,824, dated Aug. 27, 2024, 8 pages.

* cited by examiner

VALVE

TECHNICAL FIELD

The present invention relates to a valve which controls a working fluid.

BACKGROUND ART

A valve used to control a working fluid in various industrial fields includes a valve seat and a valve body contacting and separating from the valve seat and can adjust a pressure or flow rate of a working fluid by adjusting a valve opening degree.

As such a valve, a spool valve in which a spool corresponding to a valve body moves in parallel to an opening corresponding to a valve seat, a butterfly valve in which a valve body has a rotation shaft, and a lift valve in which a valve body moves perpendicular to an opening corresponding to a valve seat are exemplified as typical valves. Among these valves, the lift valve is the most suitable for the flow rate and pressure control.

These lift valves may require extremely high flow rate control functions depending on the device in which they are used. For example, there is a demand for valve opening accuracy between the valve body and the valve seat relative to the stroke of the valve body and a demand for reliable sealing performance when the valve is closed.

As the valves requiring extremely high flow rate control functions, for example, a pilot valve used in a shock absorber or the like is exemplified. Since the lift valve used as the pilot valve controls the movement of the main valve with the control pressure in the pilot control chamber, reliable sealing performance is required when the valve is closed in addition to the valve opening accuracy between the valve body and the valve seat relative to the stroke of the valve body.

Patent Citation 1 is an example of the lift valve used in the fluid control valve as the pilot valve. The fluid control valve illustrated therein includes a valve housing which has a first flow path communicating with a piston chamber of a shock absorber and a second flow path communicating with a reservoir chamber, a main valve which accomplishes a relief function between the first flow path and the second flow path, and a pilot valve which controls a pressure of a pilot control chamber involving with the opening and closing control of the main valve. The pilot valve can control the pressure of the pilot control chamber by adjusting a pilot valve opening degree according to a balance between a driving force of a solenoid applied to the valve body and a biasing force of the biasing means.

CITATION LIST

Patent Literature

Patent Citation 1: JP 2011-525962 A (Pages 10 to 12, FIG. 3a)

SUMMARY OF INVENTION

Technical Problem

The pilot valve illustrated in Patent Citation 1 is premised that a flat surface of the valve body disposed to face a valve seat opening abuts over the entire circumference and can be sealed without a circumferential gap when the valve body is seated on the valve seat. However, since the valve body and the valve seat are separate bodies and move relative to each other, it is necessary to manufacture the valve with high accuracy and to assemble the valve with high accuracy in order to seal a circumferential gap when the valve body is seated on the valve seat. In addition, the pilot valve is repeatedly opened and closed depending on the control state. Accordingly, the collision between the valve body and the valve seat is repeated and the collision sound at that time becomes noise.

The present invention has been made in view of such problems and an object thereof is to provide a valve capable of reliably blocking a gap between a valve body and a valve seat at least in a valve closed state and reducing noise.

Solution to Problem

In order to solve the foregoing problem, a valve according to the present invention is a valve including: a valve seat; and a valve body, wherein the valve body and the valve seat are apart from each other at a gap in a radial direction and are arranged to be relatively movable in a reciprocating manner, the valve further comprises a sealing body that is elastically deformable and that is formed in an annular shape, and the sealing body extends from one of the valve body and the valve seat so as to seal the gap. According to the aforesaid feature of the present invention, the radial gap between the valve body and the valve seat is sealed by the annular sealing body while the valve body and the valve seat move close to each other. Therefore, the flow of the working fluid can be reliably stopped within the elastic deformation range of the sealing body and high precision valve manufacturing and assembly processes are not required. Further, since the elastically deformable annular sealing body provided in the valve body or the valve seat comes into contact with the valve seat or the valve body while the valve body and the valve seat move close to each other and the shock generated at the time of contact is reduced by the elastic deformation, the generation of noise can be prevented.

It may be preferable that one of the valve body and the valve seat has a regulation portion configured to regulate deformation of the sealing body. According to this preferable configuration, excessive deformation of the sealing body can be prevented.

It may be preferable that one of the valve body and the valve seat is provided with a convex portion which is protruded in an axial direction and remaining one of the valve body and the valve seat is provided with a concave portion which is recessed in the axial direction so that the convex portion is insertable into the concave portion, and the sealing body is formed to protrude radially outward from the convex portion. According to this preferable configuration, since the convex portion supporting the sealing body in a cantilevered manner is disposed on the inner radial side of the concave portion, the outer peripheral portion of the sealing body can be widely used as an elastically deformable area.

It may be preferable that a large diameter portion which is provided on a proximal side of the convex portion is a regulation portion configured to regulate deformation of the sealing body. According to this preferable configuration, excessive deformation of the sealing body can be regulated with a simple configuration.

It may be preferable that the sealing body is formed of metal and has an inner radial portion that is fitted to an annular groove formed in the convex portion. According to this preferable configuration, both rigidity and deformation of the sealing body supported in a cantilevered manner can be achieved.

DESCRIPTION OF EMBODIMENTS

A mode for carrying out a valve according to the present invention will be described below with reference to an embodiment.

Embodiment

A fluid control valve to which a valve according to an embodiment of the present invention is applied will be described with reference to FIGS. 1 to 7. In the embodiment, a pilot valve in the fluid control valve used in a shock absorber will be described as an example of the valve of the present invention, but can be applied to other uses. Hereinafter, the top and bottom of the fluid control valve as viewed from the front in FIG. 1 will be described as the top and bottom of the fluid control valve. Specifically, a description will be made such that the lower side of the paper where a main valve 60 is disposed is the lower side of the fluid control valve and the upper side of the paper where a solenoid 80 is disposed as a drive source is the upper side of the fluid control valve.

Figure 1:
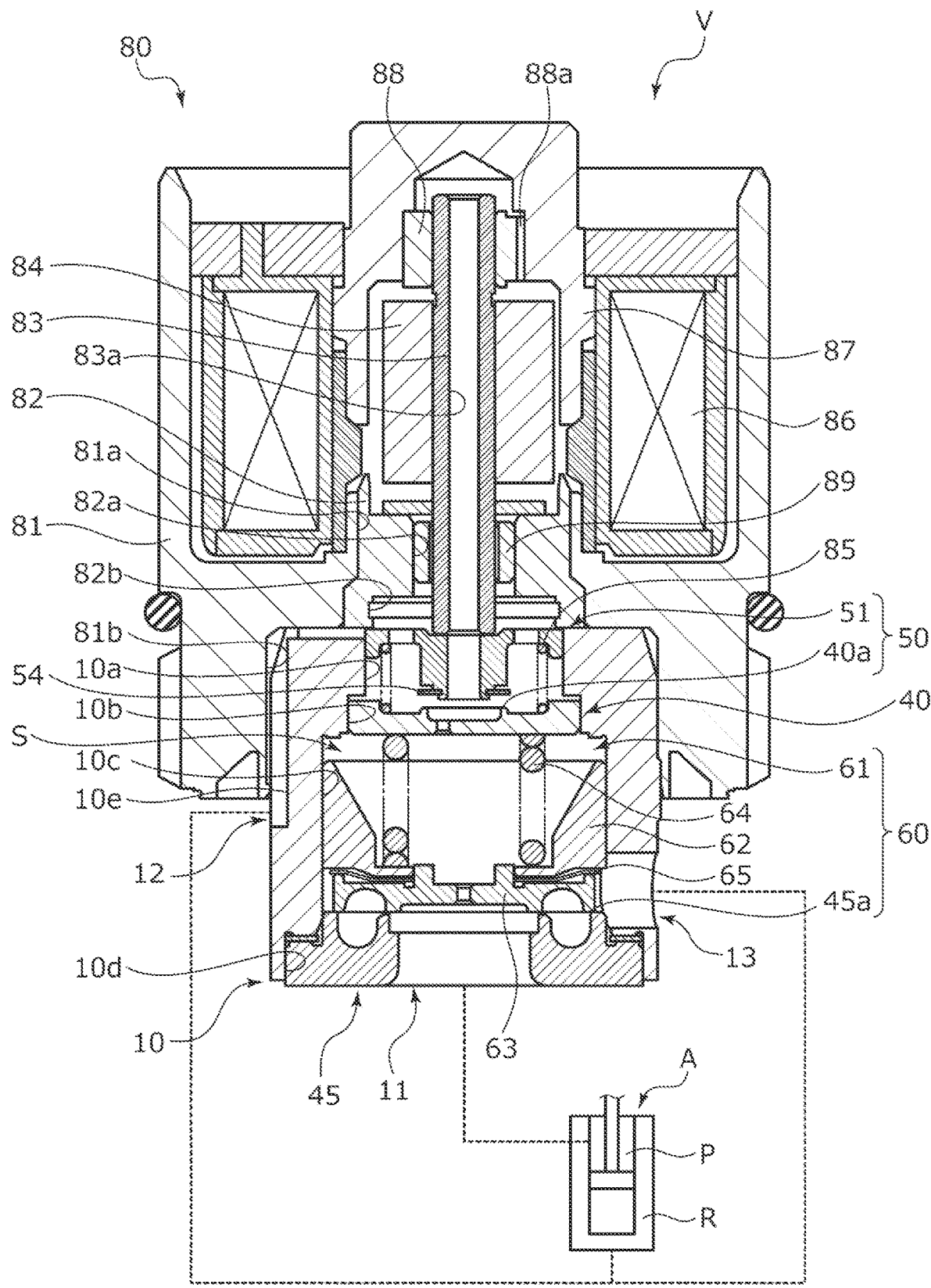
FIG. 1 is a cross-sectional view illustrating a fluid control valve to which a valve according to an embodiment of the present invention is applied.

Referring to FIG. 1, a fluid control valve V of the present invention is fluidly connected to an absorber piston chamber P and a reservoir chamber R of a shock absorber A.

When the absorber piston moves in the axial direction so that a pressure of a working fluid of a first flow path 11 becomes high, the fluid control valve V opens a main valve 60 so that the working fluid flows out from a second flow path 13 to the reservoir chamber R. Accordingly, the fluid control valve V controls the flow rate of the working fluid flowing from the absorber piston chamber P toward the reservoir chamber R.

Further, in the fluid control valve V, the fluid control characteristic of the main valve 60 is adjusted by a pilot valve 50.

Thus, the fluid control valve V controls the damping force of the shock absorber A.

Next, the structure of the fluid control valve V will be described. As illustrated in FIG. 1, the fluid control valve V mainly includes a valve housing 10, a pilot valve 50 which is a valve, a main valve 60, and a solenoid 80.

Among these, the pilot valve 50 is disposed at the upper end portion inside the valve housing 10. Further, the main valve 60 is disposed below the pilot valve 50 inside the valve housing 10.

The pilot valve 50 includes a pilot valve body 51 which is a valve body and a pilot valve seat 40a which is a valve seat. The pilot valve 50 is opened and closed in such a manner that a sealing body 54 constituting the pilot valve body 51 contacts and separates from the pilot valve seat 40a.

The main valve 60 includes a main valve body 61 and a main valve seat 45a. The main valve 60 is opened and closed in such a manner that an opening and closing portion 63 constituting the main valve body 61 contacts and separates from the main valve seat 45a.

First, the solenoid 80 will be described. The solenoid 80 is connected to the valve housing 10 and applies a driving force to the pilot valve body 51.

As illustrated in FIG. 1, the solenoid 80 mainly includes a casing 81, a center post 82, a rod 83, a movable iron core 84, a coil spring 85, a coil 86, a sleeve 87, and bearings 88 and 89.

The casing 81 includes a stepped cylindrical main body portion 81a into which the center post 82 is fitted and fixed from the axially lower side.

Further, the casing 81 is provided with an opening portion 81b which is continuous to the lower end of the main body portion 81a and is opened downward.

The center post 82 is formed in a stepped cylindrical shape from a rigid body made of a magnetic material such as iron or silicon steel.

The center post 82 includes a cylindrical main body portion 82a which extends in the axial direction.

Further, the center post 82 is provided with an opening portion 82b which is continuous to the lower end of the main body portion 82a and is opened to the lower side of the center post 82.

The rod 83 is formed in a cylindrical shape. The rod 83 is inserted through the center post 82 and is disposed to be movable in a reciprocating manner in the axial direction.

Further, the rod 83 is fitted and fixed to the movable iron core 84. Accordingly, when the solenoid 80 is energized, the rod 83 is moved while following the movable iron core 84 moving in the valve closing direction. Accordingly, the rod 83 moves the pilot valve body 51 in the valve closing direction, that is, toward the axially lower side.

Further, the upper end portion of the rod 83 is inserted through the bearing 88 and the lower end portion thereof is inserted through the bearing 89. By these bearings 88 and 89, the movement of the rod 83 in the axial direction is guided. Therefore, the rod 83 is less likely to tilt in the radial direction when moving in the axial direction.

Further, the rod 83 is provided with a communication path 83a penetrating in the axial direction.

The bearing 88 is provided with a communication groove 88a which extends in the axial direction. Accordingly, the influence of the working fluid during the movement of the rod 83 and the movable iron core 84 is reduced.

The coil spring 85 is disposed between a pilot valve seat member 40 and the pilot valve body 51.

The coil spring 85 biases the pilot valve body 51 in the valve opening direction of the pilot valve 50, that is, toward the axially upper side.

The coil 86 is an excitation coil wound around the center post 82 through a bobbin.

The sleeve 87 is formed in a bottomed cylindrical shape. Further, the bearings 88 and 89 guiding the movement of the rod 83 are fitted and fixed to the sleeve 87.

Next, the configuration on the side of the valve housing 10 will be described. The components on the side of the valve housing 10 are the valve housing 10, the pilot valve 50, and the main valve 60.

As illustrated in FIG. 1, the valve housing 10 is formed in a stepped cylindrical shape from a metal material or a resin material.

A cylindrical portion 10a, a small-diameter bottomed cylindrical portion 10b, a medium-diameter bottomed cylindrical portion 10c, and a large-diameter bottomed cylindrical portion 10d are formed in the valve housing 10 in order from the axially upper side.

The pilot valve body 51 is inserted into the cylindrical portion 10a from the axially upper side.

Figure 2:
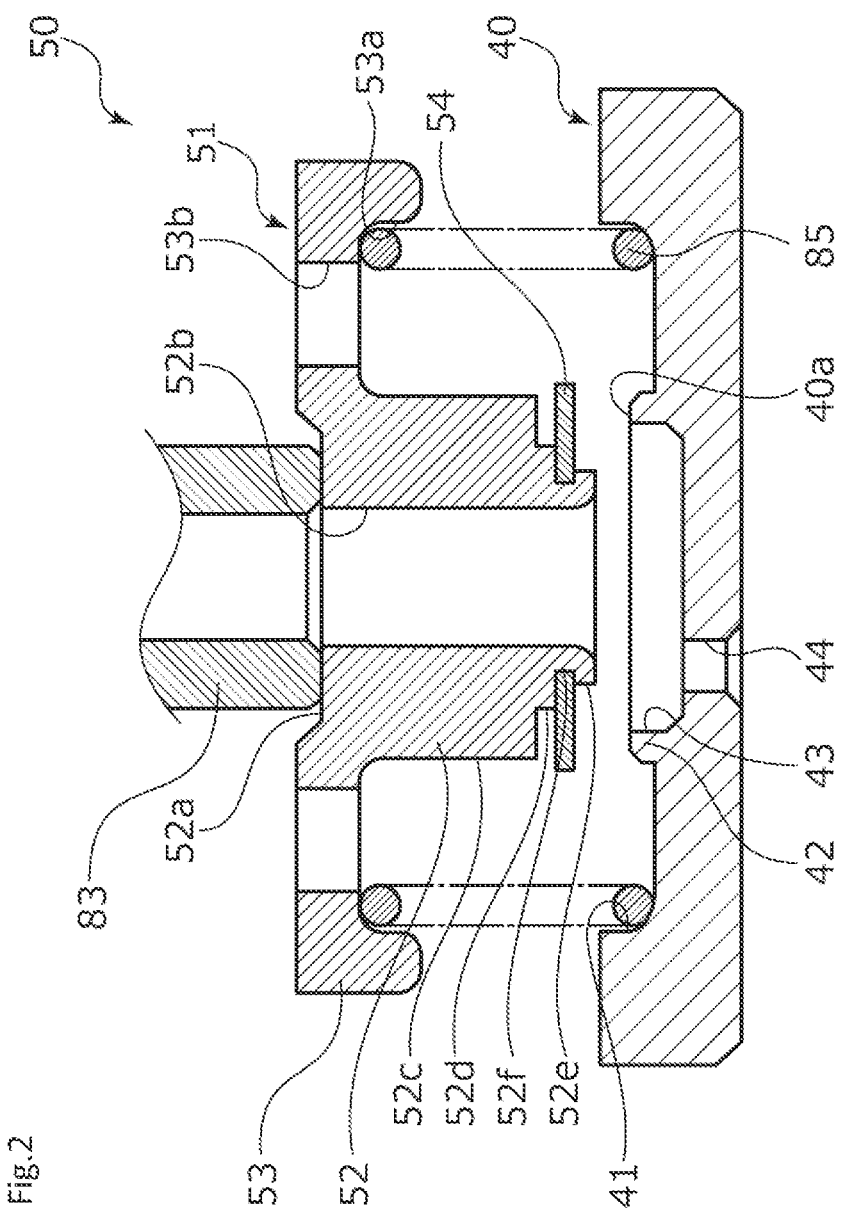
FIG. 2 is a cross-sectional view illustrating a state in which the valve applied to the fluid control valve in the embodiment is opened.

As illustrated in FIG. 2, the pilot valve body 51 is formed in a T shape in a cross-sectional view. Specifically, the pilot valve body 51 includes a cylindrical portion 52, a flange portion 53, and a sealing body 54.

The upper end portion of the cylindrical portion 52 is provided with a concave portion 52a which is recessed toward the axially lower side. The lower end portion of the rod 83 comes into contact with the bottom surface of the concave portion 52a. Accordingly, the pilot valve body 51 which receives the biasing force of the coil spring 85 comes into press-contact with the rod 83.

A communication path 52b which penetrates in the axial direction is formed on the inner radial side of the concave portion 52a.

Further, the cylindrical portion 52 has a stepped cylindrical shape which extends in the axial direction. Specifically, a large diameter portion 52c, a medium diameter portion 52d, and a small diameter portion 52e are formed in the cylindrical portion 52 in order from the axially upper side. The large diameter portion 52c, the medium diameter portion 52d, and the small diameter portion 52e constitute a convex portion of the valve body of this embodiment.

The outer diameter of the large diameter portion 52c is substantially the same as the outer diameter of an annular convex portion 42 of the pilot valve seat member 40 to be described later. Further, the outer diameter of the medium diameter portion 52d is smaller than a circular concave portion 43 which is a concave portion of the pilot valve seat member 40 to be described later.

Figure 3:
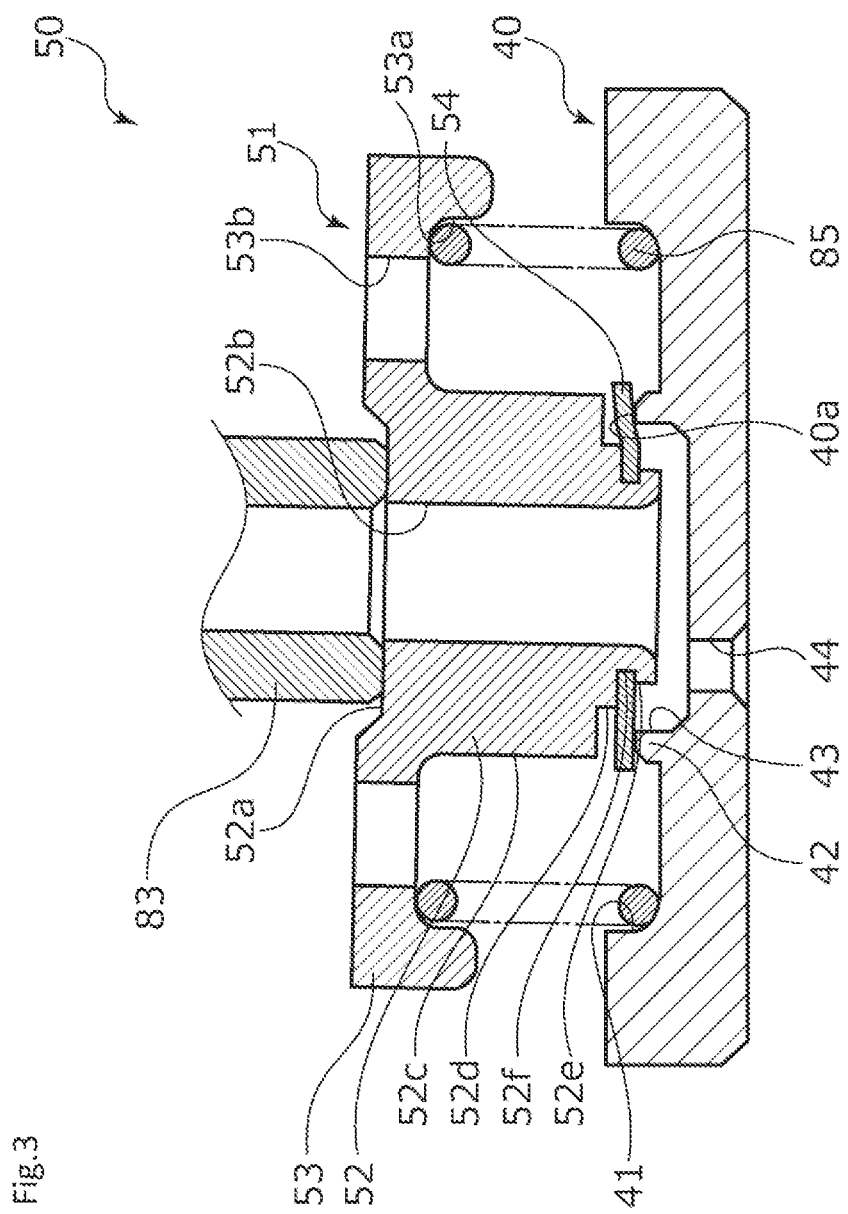
FIG. 3 is a cross-sectional view illustrating a state in which the valve applied to the fluid control valve in the embodiment is closed.

Accordingly, as illustrated in FIG. 3, in a state in which the small diameter portion 52e of the cylindrical portion 52 extends into the circular concave portion 43 of the pilot valve seat member 40 to be disposed in a telescopic manner, in other words, a state in which the small diameter portion 52e and the circular concave portion 43 axially overlap each other, that is, radially overlap each other, each of the outer peripheral surfaces of the medium diameter portion 52d and the small diameter portion 52e is separated from the inner peripheral surface of the circular concave portion 43 and a gap is formed therebetween.

The flange portion 53 which extends in the outer radial direction is continuous to the upper end of the large diameter portion 52c. Further, the medium diameter portion 52d having a diameter smaller than that of the large diameter portion 52c is continuous to the lower end of the large diameter portion 52c.

The flange portion 53 has a disk shape which extends in the outer radial direction from the upper end portion of the cylindrical portion 52.

An annular concave portion 53a which is recessed toward the axially upper side is formed at the lower end portion of the flange portion 53.

The annular concave portion 53a is formed to have substantially the same outer radial as the outer radial of an annular concave portion 41 of the pilot valve seat member 40 to be described later. These outer radials are formed slightly larger than the outer radial of the coil spring 85.

The coil spring 85 is disposed on the annular concave portion 53a and the annular concave portion 41 of the pilot valve seat member 40. Therefore, the coil spring 85 is guided by the outer peripheral surface of the annular concave portion 41 of the pilot valve seat member 40 and the annular concave portion 53a when compressed in the axial direction to prevent the coil spring 85 from being twisted or bent.

Further, the flange portion 53 is provided with a communication path 53b which penetrates in the axial direction. The communication path 53b communicates the cylindrical portion 10a of the valve housing 10 with the opening portion 82b (see FIG. 1) of the center post 82.

Further, the outer peripheral surface of the flange portion 53 is formed to be movable while sliding on the inner peripheral surface of the cylindrical portion 10a of the valve housing 10. Accordingly, the cylindrical portion 10a can guide the movement of the pilot valve body 51.

The small diameter portion 52e having a diameter smaller than that of the medium diameter portion 52d is continuous to the lower end of the medium diameter portion 52d.

An annular groove 52f which is recessed toward the inner radial side is formed in the small diameter portion 52e to be continuous to the lower end surface of the medium diameter portion 52d. The inner radial side end portion of the disk-shaped sealing body 54 is fitted and fixed to the annular groove 52f. That is, the sealing body 54 is cantilevered by the annular groove 52f and protrudes in the outer radial direction from the annular groove 52f.

The sealing body 54 is formed of a metal material and is elastically deformable in the axial direction (see FIG. 3). Needless to say, the material forming the sealing body 54 is not limited to metal.

The outer diameter of the sealing body 54 is formed to be larger than the outer diameter of the annular convex portion 42 of the pilot valve seat member 40. Further, the upward bending deformation of the sealing body 54 is regulated by the large diameter portion 52c of the cylindrical portion 52 and the sealing body is deformable only in the elastic deformation area.

Accordingly, as illustrated in FIG. 3, in a state in which the small diameter portion 52e of the cylindrical portion 52 extends into the circular concave portion 43 of the pilot valve seat member 40 to be disposed in a telescopic manner, as illustrated in the right half of FIG. 3, the sealing body 54 can be seated on the pilot valve seat 40a while the sealing body 54 is elastically bent in the axial direction, more accurately, the sealing body 54 is bent toward the axially upper side.

Returning to the configuration of the valve housing 10, the small-diameter bottomed cylindrical portion 10b is continuous to the cylindrical portion 10a and is recessed toward the axially upper side while the inner side of the cylindrical portion 10a is enlarged in diameter.

The pilot valve seat member 40 that is press-inserted from the axially lower side is integrally fixed to the small-diameter bottomed cylindrical portion 10b in a substantially sealed state.

As illustrated in FIG. 2, the pilot valve seat member 40 is formed in a disc shape from a metal material or a resin material. The annular concave portion 41 which is recessed toward the axially lower side is formed in the upper end portion of the pilot valve seat member 40.

Further, an annular convex portion 42 which protrudes toward the axially upper side on the inner radial side of the annular concave portion 41 is formed in the upper end portion of the pilot valve seat member 40. The upper end portion of the annular convex portion 42 is the pilot valve seat 40a.

Further, a circular concave portion 43 which is a concave portion recessed toward the axially lower side in relation to the bottom surface of the annular concave portion 41 on the inner radial side of the annular convex portion 42 is formed at the upper end portion of the pilot valve seat member 40. Further, a communication path 44 which penetrates in the axial direction is formed on the bottom portion of the circular concave portion 43.

Returning to the configuration of the valve housing 10, the medium-diameter bottomed cylindrical portion 10c is continuous to the small-diameter bottomed cylindrical portion 10b and is recessed toward the axially upper side while the inner side of the small-diameter bottomed cylindrical portion 10b is enlarged in diameter.

The main valve body 61 and a coil spring 64 are inserted into the medium-diameter bottomed cylindrical portion 10c from the axially lower side. Further, the upper end portion of the main valve seat member 45 press-inserted from the axially lower side is integrally fixed to the medium-diameter bottomed cylindrical portion 10c in a substantially sealed state.

In addition, as illustrated in FIG. 1, a pilot control chamber S is formed in a space inside the small-diameter bottomed cylindrical portion 10b and the medium-diameter bottomed cylindrical portion 10c of the valve housing 10. The pilot control chamber S is defined by the small-diameter bottomed cylindrical portion 10b, the medium-diameter bottomed cylindrical portion 10c, the pilot valve seat member 40, the pilot valve body 51, and the main valve body 61.

That is, the pilot control chamber S includes the circular concave portion 43 and the communication path 44 of the pilot valve seat member 40 and is the upstream flow path of the pilot valve body 51, that is, the upstream flow path of the pilot valve 50 (see FIG. 2).

Figure 4:
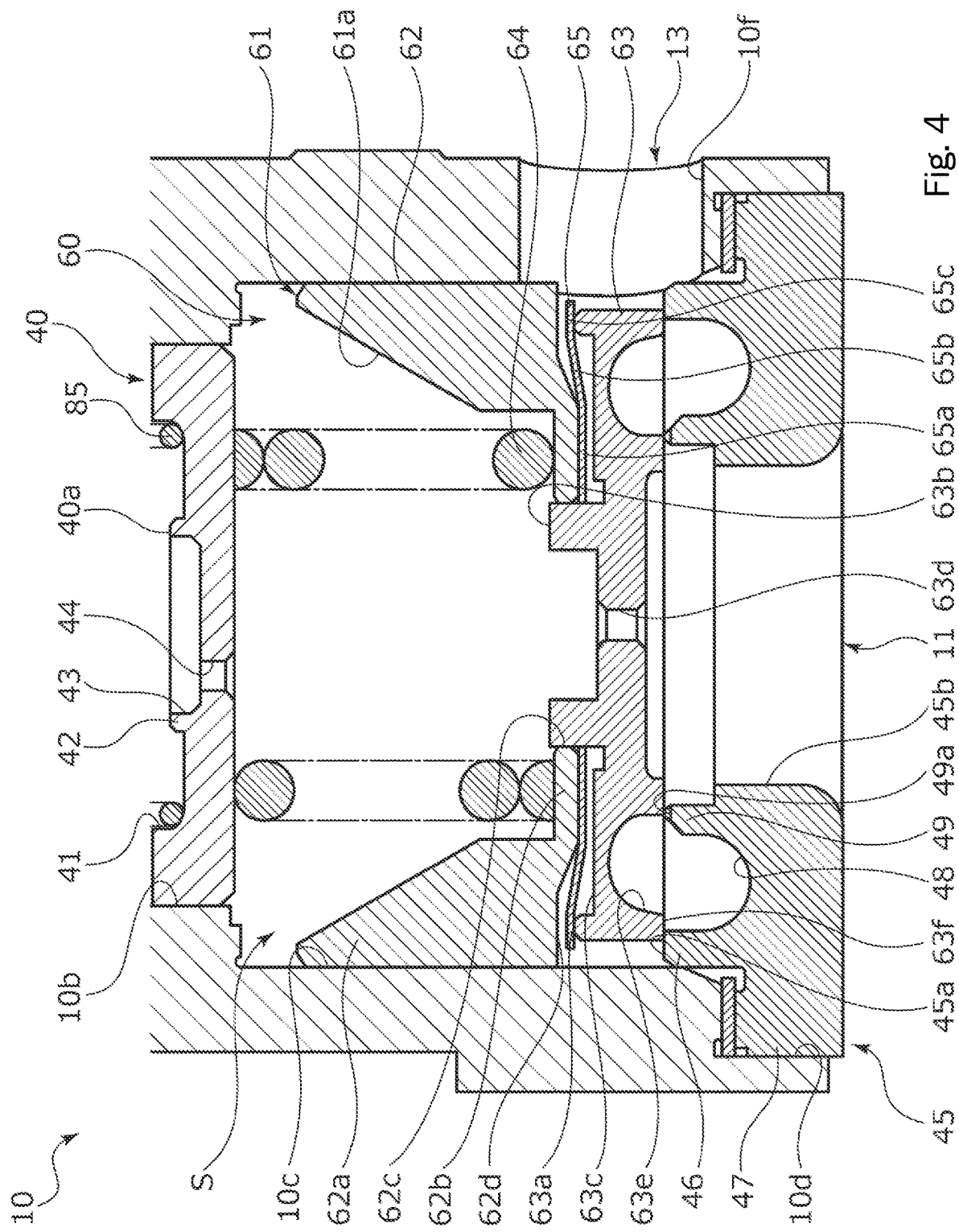
FIG. 4 is an enlarged cross-sectional view illustrating a main valve of the fluid control valve in the embodiment.

As illustrated in FIG. 4, the main valve body 61 mainly includes a piston 62 which is formed in a U-shaped cylindrical shape in a cross-sectional view and an opening and closing portion 63. That is, the main valve body 61 is divided into two parts in the axial direction by the piston 62 and the opening and closing portion 63.

The piston 62 includes a cylindrical portion 62a which is provided to extend in the axial direction and a bottom portion 62b which extends in the inner radial direction from the lower end portion of the cylindrical portion 62a and a through-hole 62c which penetrates in the axial direction is formed at the center of the bottom portion 62b.

Further, the coil spring 64 which biases the piston 62 in the valve closing direction, that is, toward the axially lower side is disposed between the bottom portion 62b of the piston 62 and the pilot valve seat member 40 in a compressed state. Further, a leaf spring 65 which biases the opening and closing portion 63 in the valve closing direction, that is, toward the axially lower side is disposed between the piston 62 and the opening and closing portion 63.

Further, the piston 62 is provided with a concave portion 61a which is defined by the inner peripheral surface of the cylindrical portion 62a and the upper end surface of the bottom portion 62b and is recessed in a funnel shape toward the axially lower side.

An annular concave portion 62d which is recessed toward the axially upper side is formed in the outer radial side lower end portion of the cylindrical portion 62a.

The opening and closing portion 63 includes an annular outer radial side convex portion 63a which protrudes from the outer radial side end portion toward the axially upper side and an annular inner radial side convex portion 63b which protrudes from the radial center portion toward the axially upper side and an annular concave portion 63c is formed between the outer radial side convex portion 63a and the inner radial side convex portion 63b. The inner radial side convex portion 63b is inserted into the through-hole 62c of the piston 62.

In a state in which the inner radial side convex portion 63b of the opening and closing portion 63 is inserted into the through-hole 62c of the piston 62, the outer peripheral surface of the inner radial side convex portion 63b and the inner peripheral surface of the bottom portion 62b of the piston 62 are formed to be substantially parallel to each other. Therefore, the opening and closing portion 63 is movable in the axial direction while sliding on the piston 62.

The radial center portion of the opening and closing portion 63 is provided with a communication path 63d which penetrates in the axial direction. Additionally, the inside of the main valve body 61 communicates with the first flow path 11 through the communication path 63d of the opening and closing portion 63.

The outer radial side lower end portion of the opening and closing portion 63 is provided with an annular concave portion 63e which is recessed toward the axially upper side. A lower end portion 63f of the opening and closing portion 63 located on the outer radial side of the annular concave portion 63e is seated on the main valve seat 45a in the valve closed state of the main valve 60.

Figure 5:
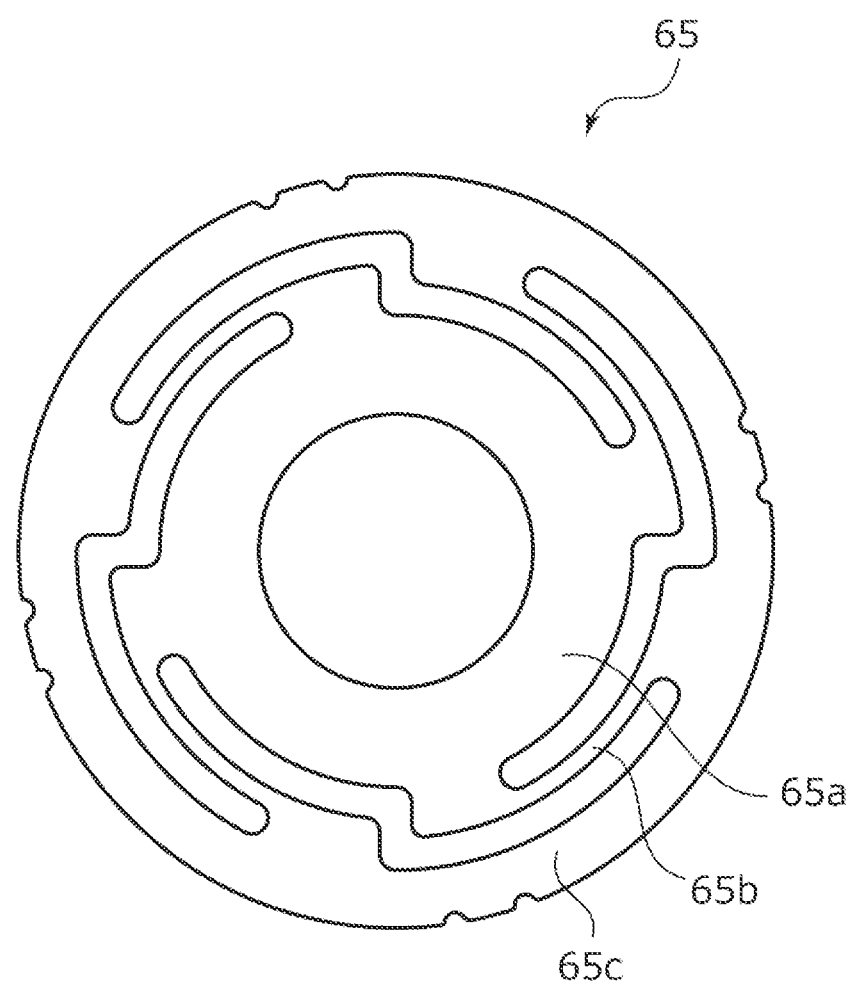
FIG. 5 is a plan view illustrating a leaf spring constituting the main valve in the embodiment.

As illustrated in FIGS. 4 and 5, the leaf spring 65 is a spring which has a stepped circular ring and plate shape in cross-section and has a spring constant lower than that of the coil spring 64. Further, the leaf spring 65 mainly includes an annular inner radial plate portion 65a, a plurality of connection portions 65b which are bent upward from the outer radial end of the inner radial plate portion 65a and are bridged, and an annular outer radial plate portion 65c which is bent downward from the outer radial end of the connection portion 65b and is connected.

In the leaf spring 65, the inner radial plate portion 65a and the outer radial plate portion 65c are substantially parallel to each other. Accordingly, the leaf spring 65 is deformable by receiving the axial load so that the bending angle of the connection portion 65b becomes small, that is, the axial distance between the inner radial plate portion 65a and the outer radial plate portion 65c becomes small.

The leaf spring 65 is disposed so that the upper end surface of the inner radial plate portion 65a comes into contact with the lower end surface of the bottom portion 62b of the piston 62 and the lower end surface of the outer radial plate portion 65c comes into contact with the upper end surface of the outer radial side convex portion 63a of the opening and closing portion 63 in the valve closed state of the main valve 60. Further, the leaf spring 65 has a spring force smaller than that of the coil spring 64 when the main valve 60 is closed.

Returning to the configuration of the valve housing 10, the large-diameter bottomed cylindrical portion 10d is continuous to the medium-diameter bottomed cylindrical portion 10c and is recessed toward the axially upper side while the inner side of the medium-diameter bottomed cylindrical portion 10c is enlarged in diameter.

The main valve seat member 45 that is press-inserted from the axially lower side is integrally fixed to the large-diameter bottomed cylindrical portion 10d in a substantially sealed state.

As illustrated in FIG. 4, the main valve seat member 45 is formed in a cylindrical shape having the first flow path 11 penetrating in the axial direction from a metal material or a resin material.

The main valve seat member 45 includes a cylindrical portion 46 which extends in the axial direction and an annular flange portion 47 which extends toward the outer radial side from the lower end portion of the cylindrical portion 46. Further, in the main valve seat member 45, the flange portion 47 is press-inserted and fixed in a sealed state to the large-diameter bottomed cylindrical portion 10d from the axially lower side through a gasket in a state in which the upper end portion of the cylindrical portion 46 is inserted into the lower end portion of the medium-diameter bottomed cylindrical portion 10c.

Further, the upper end portion of the cylindrical portion 46 is provided with an annular concave portion 48 which is recessed in a U shape in a cross-sectional view toward the axially lower side. A communication path 45b which penetrates in the axial direction and into which the working fluid flows from the absorber piston chamber P is formed on the inner radial side of the annular concave portion 48.

Further, an annular land 49 is formed between the annular concave portion 48 and the communication path 45b on the inner radial side of the cylindrical portion 46. A plurality of communication grooves 49a which extend in the radial direction and communicate the annular concave portion 48 and the communication path 45b with each other are formed in the upper end portion of the land 49 in the circumferential direction. With this communication groove 49a, the working fluid can be introduced into the annular concave portion 48 and the annular concave portion 63e of the opening and closing portion 63 even in the valve closed state of the main valve 60.

The communication path 45b of the main valve seat member 45, the annular concave portion 48, and the communication groove 49a constitute the upstream flow path of the main valve 60, that is, the first flow path 11 together with the lower end portion of the opening and closing portion 63.

Returning to FIG. 1, a communication groove 10e which has a downward L-shape in a cross-sectional view from the upper end to the side surface of the cylindrical portion 10a is formed on the outer surface of the valve housing 10. Specifically, the communication groove 10e extends toward the outer radial direction along the upper end surface of the valve housing 10 and then extends toward the axially lower side in a substantially orthogonal direction along the outer peripheral surface of the valve housing 10.

Further, the lower side end portion of the communication groove 10e extends downward in relation to the lower end of the opening portion 81b in a state in which the valve housing 10 is fitted to the opening portion 81b of the casing 81 and the working fluid can flow from the lower end of the communication groove 10e to the reservoir chamber R.

Accordingly, the communication groove 10e constitutes a pilot downstream flow path 12 of the pilot valve 50.

More specifically, the pilot downstream flow path 12 is formed by the cylindrical portion 10a, the small-diameter bottomed cylindrical portion 10b, and the communication groove 10e of the valve housing 10, the upper end portion on the outer radial side of the annular convex portion 42 in the pilot valve seat member 40, the opening portion 81b of the casing 81, and the opening portion 82b of the center post 82.

Further, as illustrated in FIG. 4, the valve housing 10 is provided with a communication path 10f which extends from the medium-diameter bottomed cylindrical portion 10c toward the outer radial side and communicates the inside of the medium-diameter bottomed cylindrical portion 10c with the reservoir chamber R and the working fluid can flow from the communication path 10f into the reservoir chamber R.

Accordingly, the communication path 10f constitutes the downstream flow path of the main valve 60, that is, the second flow path 13.

More specifically, the second flow path 13 is formed by the medium-diameter bottomed cylindrical portion 10c, the large-diameter bottomed cylindrical portion 10d, and the communication path 10f of the valve housing 10, the main valve body 61, and the main valve seat member 45.

Next, the operation of the fluid control valve V, mainly the opening and closing operations of the pilot valve 50 and the main valve 60 will be described with reference to FIGS. 1 to 7.

First, the fluid control valve V in the non-energized state will be described. Referring to FIGS. 1 and 2, when the pilot valve 50 is not energized, the pilot valve body 51 is pressed toward the axially upper side by the biasing force of the coil spring 85. Accordingly, the sealing body 54 (see FIG. 2) of the pilot valve body 51 is separated from the pilot valve seat 40a and the pilot valve 50 is opened. The pilot valve opening degree at this embodiment becomes maximal in this embodiment.

In a non-energized state, when the shock absorber A is operated so that the pressure of the working fluid in the first flow path 11 becomes high, the working fluid passes through the communication path 63d (see FIG. 4) of the opening and closing portion 63 and the pilot control chamber S and flows from the pilot downstream flow path 12 into the reservoir chamber R. Also, as will be described later, the working fluid may also flow into the reservoir chamber R from the second flow path 13 depending on the pressure of the working fluid.

In the fluid control valve V, the flow path cross-sectional area of the communication path 63d of the opening and closing portion 63 is formed to be narrow. Therefore, even when the pressure of the working fluid of the first flow path 11 is high, it is difficult for the pressure of the working fluid of the pilot control chamber S to increase in response to the pressure of the working fluid in the first flow path 11. Thus, a differential pressure is generated between the pressure of the working fluid of the first flow path 11 and the pressure of the working fluid in the pilot control chamber S. As the differential pressure increases, the main valve 60 is likely to be open.

Based on this, in this embodiment, with respect to the pressure of the working fluid in the pilot control chamber S, the pressure of the working fluid in the first flow path 11 sufficient to deform only the leaf spring 65 is assumed to be pressure P1 and the pressure of the working fluid in the first flow path 11 sufficient to deform the leaf spring 65 and the coil spring 64 is assumed to be the pressure P2. Here, the pressure P1 becomes lower than the pressure P2 (P1<P2).

Additionally, in the following description, the pressure of the working fluid of the first flow path 11 is described as the "pressure Pin of the first flow path 11" and the pressure of the working fluid of the pilot control chamber S is described as the "pressure Ps of the pilot control chamber S".

When the differential pressure ΔP (=Pin−Ps) between the pressure Pin of the first flow path 11 and the pressure Ps of the pilot control chamber S becomes small after the main valve 60 is opened, the main valve 60 is closed.

The reason why the differential pressure ΔP becomes small is a decrease in the pressure Pin of the first flow path 11 when the working fluid passes through the main valve 60 and flows from the second flow path 13 into the reservoir chamber R, a decrease in the pressure Pin of the first flow path 11 when the working fluid flows from the communication path 63d into the pilot control chamber S, or an increase in the pressure Ps of the pilot control chamber S when the volume of the pilot control chamber S becomes narrow due to the movement of the main valve body 61. Hereinafter, the opening and closing operation of the main valve 60 will be described in more detail with specific examples.

Figure 6:
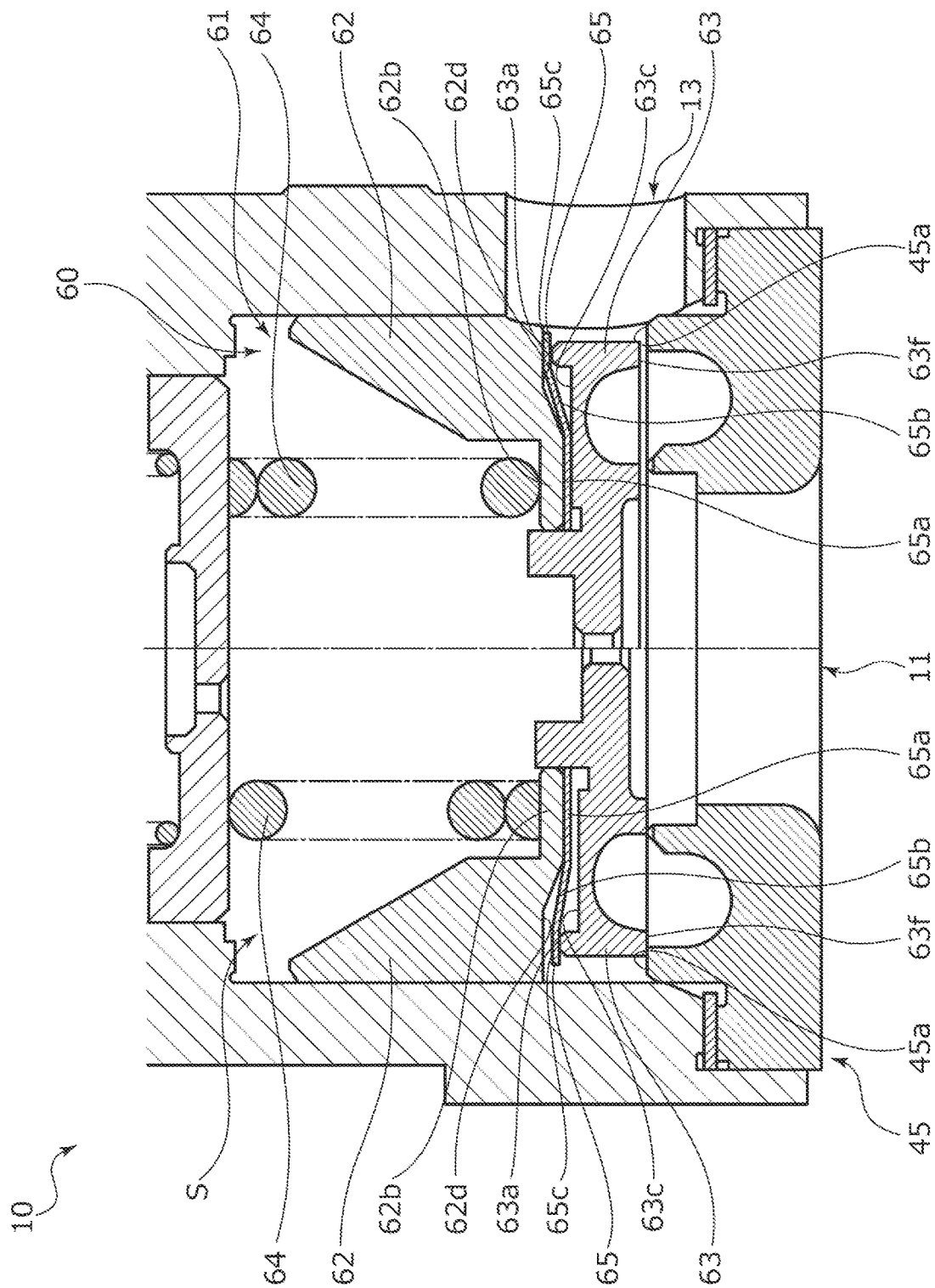
FIG. 6 is a cross-sectional view sequentially illustrating a state in which the main valve of the fluid control valve in the embodiment is closed and a state in which the main valve is opened by compressing a second biasing means.

Referring to FIGS. 1 and 6, for example, when the pressure Pin of the first flow path 11 is lower than the pressure P1 (Pin<P1), such as when the absorber piston in the shock absorber A reciprocates with a minute stroke while traveling on a smooth road surface, in the main valve body 61, the lower end portion 63f of the opening and closing portion 63 is seated on the main valve seat 45a and the main valve 60 is closed due to the biasing force of the coil spring 64 and the leaf spring 65.

Referring to the left half of FIG. 6, in the valve closed state of the main valve 60, a force in which the coil spring 64 biases the piston 62 downward becomes larger than a force in which the leaf spring 65 biases the piston 62 upward. Accordingly, the leaf spring 65 is bent and deformed in the compression direction such that the inner radial plate portion 65a on the inner radial side is pushed toward the axially lower side by the coil spring 64 and the outer radial plate portion 65c on the outer radial side is supported in a contact state from the lower side of the outer radial side convex portion 63a of the opening and closing portion 63. At this time, the inner radial plate portion 65a of the leaf spring 65 and the bottom surface of the annular concave portion 63c of the opening and closing portion 63, and the outer radial plate portion 65c of the leaf spring 65 and the bottom surface of the concave portion 62d of the piston 62 are respectively separated from each other in the axial direction, so that the allowance for moving the opening and closing portion 63 in the axial direction is obtained.

Referring to FIGS. 1 and 6, for example, when the pressure Pin of the first flow path 11 is equal to or higher than the pressure P1 and lower than the pressure P2 (P2>Pin≥P1), such as when the absorber piston in the shock absorber A reciprocates repeatedly with small strokes when traveling on an uneven road surface, only the opening and closing portion 63 moves toward the axially upper side against the biasing force of the leaf spring 65.

That is, the lower end portion 63f of the opening and closing portion 63 is slightly separated from the main valve seat 45a and the main valve 60 is opened. Accordingly, the working fluid flows from the second flow path 13 to the reservoir chamber R through the main valve 60 (see the right half in FIG. 6).

At this time, the working fluid that becomes surplus in the pilot control chamber S flows into the reservoir chamber R from the pilot downstream flow path 12 as only the opening and closing portion 63 moves.

In addition, since the main valve 60 is closed as the differential pressure ΔP decreases as described above, the valve opening degree of the main valve 60 becomes larger as the pressure Pin of the first flow path 11 becomes closer to the pressure P2.

Further, when the opening and closing portion 63 moves against the biasing force of the leaf spring 65, the lower end surface of the inner radial plate portion 65a of the leaf spring 65 comes into press-contact with the bottom surface of the annular concave portion 63c and the upper end surface of the outer radial plate portion 65c of the leaf spring 65 approaches or contacts the bottom surface of the concave portion 62d of the piston 62. Accordingly, since the upper end surface of the outer radial plate portion 65c of the leaf spring 65 comes into contact with the bottom surface of the concave portion 62d of the piston 62 when the pressure Pin of the working fluid in the first flow path 11 is the pressure P2, the pressure applied from the working fluid of the first flow path 11 is likely to be applied to the piston 62 through the opening and closing portion 63.

Figure 7:
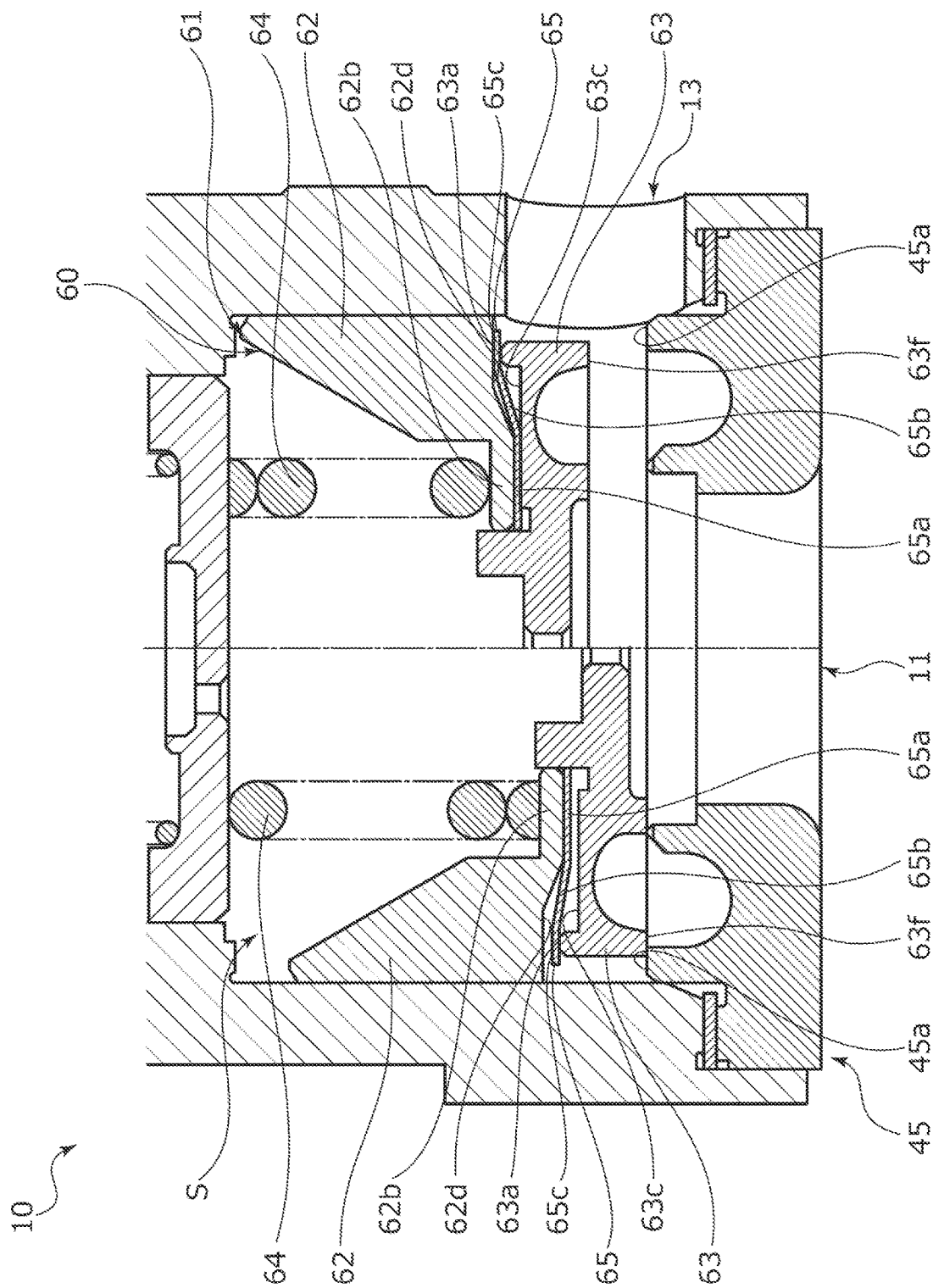
FIG. 7 is a cross-sectional view sequentially illustrating a state in which the main valve of the fluid control valve in the embodiment is closed and a state in which the main valve is opened by compressing a first biasing means and a second biasing means.

Referring to FIGS. 1 and 7, for example, when the pressure Pin of the first flow path 11 is equal to or higher than the pressure P2 (Pin≥P2), such as when the absorber piston in shock absorber A tries to make a large stroke in order to overcome a step on the road surface, not only the opening and closing portion 63 but also the piston 62 move toward the axially upper side against the biasing force of the coil spring 64 and the leaf spring 65.

That is, the lower end portion 63f of the opening and closing portion 63 is further separated from the main valve seat 45a and the main valve 60 is opened. Accordingly, the working fluid flows from the second flow path 13 to the reservoir chamber R through the main valve 60.

In addition, the valve opening degree of the main valve 60 when the pressure Pin of the first flow path 11 is equal to or higher than the pressure P2 (Pin≥P2) becomes maximal in this embodiment (see the right half of FIG. 7).

Further, the working fluid that becomes surplus in the pilot control chamber S flows from the pilot downstream flow path 12 to the reservoir chamber R as the opening and closing portion 63 moves.

In this way, the fluid control valve V can release the working fluid to the reservoir chamber R by opening the main valve 60 in approximately two stages according to the increase in the pressure Pin in the first flow path 11.

Further, since the main valve 60 is easily opened when the pilot valve opening degree of the pilot valve 50 becomes maximal in the non-energized state, the damping force of the shock absorber A is controlled to be minimum.

Then, the working fluid flows from the second flow path 13 to the reservoir chamber R through the main valve 60. As the pressure Pin of the first flow path 11 decreases, the coil spring 64 extends and the valve opening degree decreases. As described above, when the pressure Pin of the first flow path 11 is equal to or higher than the pressure P1 and lower than the pressure P2 (P2>Pin≥P1), only the opening and closing portion 63 moves toward the axially upper side against the biasing force of the leaf spring 65 (see the right half of FIG. 6).

Further, when the working fluid flows from the second flow path 13 to the reservoir chamber R through the main valve 60 so that the pressure Pin of the first flow path 11 becomes lower than the pressure P1 (Pin<P1), the leaf spring 65 extends, the lower end portion 63f of the opening and closing portion 63 is seated on the main valve seat 45a, and the main valve 60 is closed.

Next, the control of the damping force by the pilot valve 50 will be mainly described for the fluid control valve V in the energized state. Additionally, since the main valve 60 is operated in the energized state in substantially the same manner as in the non-energized state, the description thereof will be omitted.

Referring to FIGS. 1 and 3, when the electromagnetic force generated by applying a current to the solenoid 80 exceeds the biasing force of the coil spring 85 in the energized state (that is, during so-called duty control), the movable iron core 84 is drawn toward the center post 82, that is, toward the axially lower side.

Accordingly, the rod 83 fixed to the movable iron core 84 moves toward the axially lower side together with the pilot valve body 51. In response to this, the pilot valve 50 is closed when the pilot valve opening degree decreases and a current exceeding a predetermined level is applied.

When the pilot valve is opened with a small opening compared to the non-energized state, the working fluid of the first flow path 11 flows from the pilot downstream flow path 12 to the reservoir chamber R in accordance with the operation of the shock absorber A as in the non-energized state. Further, as described above, the working fluid also flows from the second flow path 13 to the reservoir chamber R depending on the pressure Pin of the first flow path 11.

Then, as the pilot valve opening degree decreases, the working fluid is less likely to flow from the pilot control chamber S to the pilot downstream flow path 12. Therefore, the differential pressure ΔP is less likely to occur between the pressure Pin of the first flow path 11 and the pressure Ps of the pilot control chamber S and the main valve 60 is less likely to be opened. That is, the damping force of the shock absorber A can be increased.

In other words, when the pilot valve opening degree is maximal, the damping force of the shock absorber A becomes minimal. That is, the damping force is controlled to be the smallest when the fluid control valve V is in the non-energized state.

Further, even when the main valve 60 is opened, the differential pressure ΔP becomes smaller in a short time as the pilot valve opening degree of the pilot valve 50 becomes smaller. That is, the opening time of the main valve 60 is shortened as the pilot valve opening degree of the pilot valve 50 becomes smaller.

For these reasons, the fluid control characteristics of the main valve 60 are controlled according to the pilot valve opening degree of the pilot valve 50. Accordingly, the fluid control valve V can variably control the damping force of the shock absorber A.

If a high pressure Pin is generated in the first flow path 11 even when a predetermined current or more is applied and the pilot valve 50 is closed, the pilot valve 50 is slightly opened due to this working fluid. Accordingly, the working fluid flows from the pilot downstream flow path 12 to the reservoir chamber R as in the non-energized state.

In this way, when the pilot valve 50 is closed in the energized state, the fluid control valve V is in a state in which it is most difficult for the working fluid to pass through the pilot valve 50 and in a state in which it is difficult to open the main valve 60. Therefore, the fluid control valve V can maximize the damping force in the shock absorber A.

In addition, a current value to be applied to the coil 86 that constitutes the solenoid 80 is set based on input parameters such as a vehicle speed, a vehicle acceleration/deceleration, a steering angle, a road surface condition, and a spring load.

Further, the pilot valve 50 in the open state may be closed by setting a current value equal to or higher than a predetermined value.

As described above, as illustrated in FIG. 3, in the pilot valve 50 of this embodiment, a gap between the pilot valve body 51 and the pilot valve seat 40a is sealed by the annular sealing body 54 while they move close to each other in a telescopic manner. Therefore, the cylindrical portion 52 and the flange portion 53 of the rigid pilot valve body 51 do not directly come into contact with the pilot valve seat member 40 including the pilot valve seat 40a, the flow of the working fluid can be reliably stopped within the elastic deformation range of the sealing body 54, and hence high precision valve manufacturing and assembly processes are not required.

Further, since the sealing body 54 comes into contact with the annular convex portion 42 and the sealing body 54 is elastically deformed to reduce a shock at the time of contact while the pilot valve body 51 is moving closer to the pilot valve seat 40a, the generation of noise at the time of collision can be prevented.

Further, since the small diameter portion 52e of the pilot valve body 51 supporting the sealing body 54 in a cantilevered manner is disposed on the inner radial side of the circular concave portion 43 of the pilot valve seat member 40, the outer peripheral portion of the sealing body 54 can be widely used as an elastically deformable area.

Further, since the deformation of the sealing body is regulated while the sealing body comes into contact with the large diameter portion 52c of the pilot valve body 51 when the sealing body 54 attempts to be excessively deformed, the excessive deformation of the sealing body 54 can be prevented. That is, the large diameter portion 52c is a regulation portion of this embodiment.

Further, since the large diameter portion 52c which is formed on a proximal side of the small diameter portion 52e of the pilot valve body 51 is a regulation portion of this embodiment, excessive deformation of the sealing body 54 can be restricted with a simple configuration.

Further, since the sealing body 54 is formed of metal and the inner radial portion is fitted to the annular groove 52f of the pilot valve body 51, deformation of the inner radial portion fitted in the annular groove 52f due to its own elastic force is reliably prevented. Accordingly, both rigidity and deformation of the cantilevered sealing body 54 can be achieved.

Further, since the sealing body 54 is formed of metal, the applicable temperature range is higher than that of the sealing body made of resin. Accordingly, the temperature of the working fluid becomes low in cold regions. As in the shock absorber A which becomes hot in accordance with the driving of the piston, the working fluid can be stably used even when the working fluid is applied to a device in which the temperature changes greatly.

Further, since the working fluid flows into the circular concave portion 43 and the communication path 44 of the pilot valve seat member 40 to be applied to the sealing body 54 and the small diameter portion 52e when the pilot valve 50 is closed, the pilot valve is likely to be opened when a high pressure is generated in the first flow path 11.

In addition, the pilot valve 50 may be slightly opened by the elastic deformation of the sealing body 54 when a high pressure is generated in the first flow path 11 at the time of closing the pilot valve 50.

Further, since the pilot valve body 51 and the rod 83 are separated from each other, they can be easily manufactured while maintaining high valve closing performance compared to the configuration in which the pilot valve body and the rod are integrally formed with each other.

Although the embodiments of the present invention have been described above with reference to the drawings, the specific configuration is not limited to these examples, and any changes or additions that do not depart from the scope of the present invention are included in the present invention.

For example, in the above-described embodiment, the pilot valve has been described such that the convex portion is formed in the pilot valve body and the concave portion is formed in the pilot valve seat, but the present invention is not limited thereto. For example, the concave portion may be formed in the pilot valve body and the convex portion may be formed in the pilot valve seat.

Further, the pilot valve has been described such that the pilot valve body includes the sealing body, but the present invention is not limited thereto. For example, the pilot valve seat may include the sealing body.

Further, the sealing body has been described such that the sealing body extends radially outward from the outer peripheral surface of the convex portion, but the present invention is not limited thereto. For example, the sealing body may extend radially inward from the inner peripheral surface of the concave portion.

Further, the sealing body has been described such that the sealing body is formed of a metal material, but the present invention is not limited thereto. For example, the sealing body may be formed of resin.

Further, the regulation portion has been described such that the regulation portion is the large diameter portion which is provided on a proximal side of the convex portion, but the present invention is not limited thereto. For example, the regulation portion having a diameter larger than that of the large diameter portion may be integrally formed or a separate regulation member may be fixed to the cylindrical portion or the flange portion of the pilot valve body.

Further, the main valve body has been described such that the main valve body is divided into two parts of the piston and the opening and closing portion, but the present invention is not limited thereto. For example, the base portion may be divided into two parts or more such that the base portion is divided into three parts or more including the base portion and the opening and closing portion. That is, the main valve may be openable in approximately three stages such that the rigid base portion is divided into two parts in the axial direction and a third biasing means having a spring force different from those of the first biasing means and the second biasing means is interposed between the upper base portion and the lower base portion.

Further, the valve seat has been described as one formed in the valve seat member separated from the valve housing, but the present invention is not limited thereto. For example, the valve seat may be integrally formed with the valve housing.

Further, the second biasing means has been described as the leaf spring, but the present invention is not limited thereto. For example, the second biasing means may be changed to a coil spring, a disc spring, or the like as appropriate.

REFERENCE SIGNS LIST

10 Valve housing
11 First flow path
12 Pilot downstream flow path
13 Second flow path
40$a$ Pilot valve seat (valve seat)
43 Circular concave portion (concave portion)
45$a$ Main valve seat
50 Pilot valve (valve)
51 Pilot valve body (valve body)
52$c$ Large diameter portion (part of convex portion, regulation portion)
52$d$ Medium diameter portion (part of convex portion)
52$e$ Small diameter portion (part of convex portion)
54 Sealing body
60 Main valve
61 Main valve body
80 Solenoid
A Shock absorber
P Absorber piston chamber
R Reservoir chamber
S Pilot control chamber
V Fluid control valve

The invention claimed is:
1. A valve, comprising:
a valve seat member provided with a valve seat; and
a valve body,
wherein the valve body and the valve seat are apart from each other at a gap in a radial direction and are arranged to be relatively movable in a reciprocating manner,
the valve further comprises a sealing body that is elastically deformable and that is formed in an annular shape, and
the sealing body extends from the valve body so as to seal the gap,
the sealing body is a disk-shaped leaf spring that has an inner radial portion fixed to the valve body and an outer radial portion disposed so as to be sandwiched by the valve member and the valve seat member,
the valve body and the outer radial portion of the disk-shaped leaf spring cooperatively form a relief space therebetween,
when the valve body is seated on the valve seat, the outer radial portion of the disk-shaped leaf spring is brought into contact with the valve seat member and is allowed to deform by the relief space, and
the valve further comprises a biasing member disposed between the valve seat member and valve body to bias the valve body in a valve opening direction.
2. The valve according to claim 1,
wherein the valve body has a regulation portion configured to regulate excessive deformation of the disk-shaped leaf spring.
3. The valve according to claim 1,
wherein valve body is provided with a convex portion which is protruded in an axial direction and the valve seat member is provided with a concave portion which is recessed in the axial direction so that the convex portion is insertable into the concave portion.
4. The valve according to claim 3,
wherein the disk-shaped leaf spring is formed of metal and has the inner radial portion that is fitted to an annular groove formed in the convex portion.
5. The valve according to claim 3,
wherein a large diameter portion which is provided on a proximal side of the convex portion is a regulation portion configured to regulate excessive deformation of the disk-shaped leaf spring.

6. The valve according to claim 5,
wherein the disk-shaped leaf spring is formed of metal and has the inner radial portion that is fitted to an annular groove formed in the convex portion.

\* \* \* \* \*

UNITED STATES PATENT AND TRADEMARK OFFICE
CERTIFICATE OF CORRECTION

PATENT NO. : 12,359,729 B2
APPLICATION NO. : 18/029065
DATED : July 15, 2025
INVENTOR(S) : Hideki Higashidozono It is certified that error appears in the above-identified patent and that said Letters Patent is hereby corrected as shown below:

In the Claims

Claim 6, Column 17, Line 1, "The valve according to claim 5," should be --The valve according to claim 4--.

Signed and Sealed this
Sixth Day of January, 2026

John A. Squires
*Director of the United States Patent and Trademark Office*